(12) United States Patent
Shen et al.

(10) Patent No.: US 9,989,968 B2
(45) Date of Patent: Jun. 5, 2018

(54) GOING BACK AND CHARGING SYSTEM FOR SWEEPING ROBOT AND METHOD FOR CONTROLLING THE SAME

(71) Applicant: JIANGSU MIDEA CLEANING APPLIANCES CO., LTD., Suzhou (CN)

(72) Inventors: Qiang Shen, Suzhou (CN); Luokun Shen, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 69 days.

(21) Appl. No.: 15/235,731

(22) Filed: Aug. 12, 2016

(65) Prior Publication Data

US 2017/0147001 A1    May 25, 2017

(30) Foreign Application Priority Data

Nov. 20, 2015  (CN) .......................... 2015 1 0810284
Nov. 20, 2015  (CN) ...................... 2015 2 0933595 U (51) Int. Cl.
*G05D 1/02* (2006.01)
*A47L 9/28* (2006.01)
*G05D 1/00* (2006.01)

(52) U.S. Cl.
CPC .......... *G05D 1/0242* (2013.01); *A47L 9/2805* (2013.01); *G05D 1/00* (2013.01);
(Continued)

(58) Field of Classification Search
CPC ............ A47L 2201/02; A47L 2201/04; A47L 9/2805; G05D 1/00; G05D 1/0225; G05D 1/0242; G05D 2201/0203
(Continued)

(56) References Cited

U.S. PATENT DOCUMENTS 4,679,152 A     7/1987  Perdue
2005/0156562 A1*  7/2005  Cohen .................. A47L 9/2857
                                                                320/107
(Continued)

FOREIGN PATENT DOCUMENTS

CN        1530781 A    9/2004
CN        1923469 A    3/2007
(Continued)

*Primary Examiner* — Dalena Tran
(74) *Attorney, Agent, or Firm* — Hodgson Russ LLP (57) ABSTRACT

A going back and charging system for a sweeping robot and a method for controlling the same are provided. The system includes: a charging station, configured to emit infrared signals to divide an area in front of the charging station into six different signal regions; six infrared receiving tubes; and a going back and charging control device, configured to control the six infrared receiving tubes to be turned on if the sweeping robot needs to be charged, to control the sweeping robot to walk toward the middle near field region if any one of the six infrared receiving tubes receives an infrared signal emitted from the charging station, and to control the sweeping robot to continue to walk until the sweeping robot docks with the charging station successfully if the fifth infrared receiving tube and the sixth infrared receiving tube receive an infrared signal of the middle near field region.

20 Claims, 5 Drawing Sheets (52) U.S. Cl.
CPC ........ *G05D 1/0225* (2013.01); *A47L 2201/02* (2013.01); *A47L 2201/04* (2013.01); *G05D 2201/0203* (2013.01)

(58) Field of Classification Search
USPC .... 701/23, 28, 300, 523; 700/245, 258, 218, 700/259; 318/568.12, 568.16; 320/109
See application file for complete search history.

(56) References Cited

U.S. PATENT DOCUMENTS

| | | |
|---|---|---|
| 2007/0096675 A1 | 5/2007 | Kim et al. |
| 2007/0233319 A1* | 10/2007 | Im .................. G05D 1/0225 700/245 |
| 2008/0065266 A1 | 3/2008 | Kim |
| 2015/0289740 A1 | 10/2015 | Yan |

FOREIGN PATENT DOCUMENTS

| | | |
|---|---|---|
| CN | 101972129 A | 2/2011 |
| CN | 201996471 U | 10/2011 |
| CN | 102262407 A | 11/2011 |
| CN | 103948354 A | 7/2014 |
| CN | 103948358 A | 7/2014 |
| CN | 204203769 U | 3/2015 |
| CN | 105242674 A | 1/2016 |
| CN | 205158132 U | 4/2016 |
| EP | 1930797 A2 | 6/2008 |

* cited by examiner

GOING BACK AND CHARGING SYSTEM FOR SWEEPING ROBOT AND METHOD FOR CONTROLLING THE SAME

CROSS-REFERENCE TO RELATED APPLICATIONS

This application is based on and claims a priority to Chinese Patent Application Nos. 201510810284.5 and 201520933595.6, filed on Nov. 20, 2015, the entire contents of which are incorporated herein by reference.

FIELD

The present disclosure relates to the robot technology field, and more particularly to a going back and charging system for a sweeping robot and a method for controlling a going back and charging system for a sweeping robot.

BACKGROUND

At present, the way that a sweeping robot goes back to a charging station is simple. For example, a direction of the charging station is determined according to a strong-weak relationship between a received left infrared signal and a received right infrared signal. In this way, although the sweeping robot may be controlled to go back to the charging station, the speed of going back is slow, and the probability that the sweeping robot docks with the charging station accurately is low, and it is impossible for the sweeping robot to adapt to complex environment.

SUMMARY

According to embodiments of the present disclosure, a going back and charging system for a sweeping robot is provided, including: a charging station, configured to emit a plurality of differently encoded groups of infrared signals, so as to divide an area in front of the charging station into six different signal regions, in which the six different signal regions include: a left near field region, a middle near field region, a right near field region, a left far field region, a middle far field region and a right far field region; six infrared receiving tubes, disposed on the sweeping robot, in which a first infrared receiving tube, a second infrared receiving tube, a third infrared receiving tube and a fourth infrared receiving tube are respectively disposed at four corners of the sweeping robot in a symmetrical manner with respect to a front-rear direction and a left-right direction, a fifth infrared receiving tube and a sixth infrared receiving tube are disposed at a front end or a rear end of the sweeping robot, and the fifth infrared receiving tube and the sixth infrared receiving tube are symmetrical with respect to the front-rear direction; and a going back and charging control device, configured to: control the six infrared receiving tubes to be turned on if it is determined that the sweeping robot needs to be charged; control the sweeping robot to walk toward the middle near field region if any one of the six infrared receiving tubes receives an infrared signal emitted from the charging station; and control the sweeping robot to continue to walk until the sweeping robot docks with the charging station successfully if the fifth infrared receiving tube and the sixth infrared receiving tube receive an infrared signal of the middle near field region.

According to embodiments of the present disclosure, a method for controlling a going back and charging system for a sweeping robot is provided. The going back and charging system includes: a charging station, configured to emit a plurality of differently encoded groups of infrared signals, so as to divide an area in front of the charging station into six different signal regions, in which the six different signal regions include: a left near field region, a middle near field region, a right near field region, a left far field region, a middle far field region and a right far field region; and six infrared receiving tubes, disposed on the sweeping robot, in which a first infrared receiving tube, a second infrared receiving tube, a third infrared receiving tube and a fourth infrared receiving tube are respectively disposed at four corners of the sweeping robot in a symmetrical manner with respect to a front-rear direction and a left-right direction, a fifth infrared receiving tube and a sixth infrared receiving tube are disposed at a front end or a rear end of the sweeping robot, and the fifth infrared receiving tube and the sixth infrared receiving tube are symmetrical with respect to the front-rear direction. The method includes: controlling the six infrared receiving tubes to be turned on if it is determined that the sweeping robot needs to be charged; controlling the sweeping robot to walk toward the middle near field region if any one of the six infrared receiving tubes receives an infrared signal emitted from the charging station; and controlling the sweeping robot to continue to walk until the sweeping robot docks with the charging station successfully if the fifth infrared receiving tube and the sixth infrared receiving tube receive an infrared signal of the middle near field region.

According to embodiments of the present disclosure, a non-transitory computer-readable storage medium is provided. The non-transitory computer-readable storage medium has stored therein instructions that, when executed by a processor of a device, causes the device to perform a method for controlling a going back and charging system for a sweeping robot, in which the going back and charging system includes: a charging station and six infrared receiving tubes disposed on the sweeping robot, the charging station is configured to emit a plurality of differently encoded groups of infrared signals, so as to divide an area in front of the charging station into six different signal regions, the six different signal regions includes a left near field region, a middle near field region, a right near field region, a left far field region, a middle far field region and a right far field region; a first infrared receiving tube, a second infrared receiving tube, a third infrared receiving tube and a fourth infrared receiving tube are respectively disposed at four corners of the sweeping robot in a symmetrical manner with respect to a front-rear direction and a left-right direction, a fifth infrared receiving tube and a sixth infrared receiving tube are disposed at a front end or a rear end of the sweeping robot, and the fifth infrared receiving tube and the sixth infrared receiving tube are symmetrical with respect to the front-rear direction; the method includes: controlling the six infrared receiving tubes to be turned on if it is determined that the sweeping robot needs to be charged; controlling the sweeping robot to walk toward the middle near field region if any one of the six infrared receiving tubes receives an infrared signal emitted from the charging station; and controlling the sweeping robot to continue to walk until the sweeping robot docks with the charging station successfully if the fifth infrared receiving tube and the sixth infrared receiving tube receive an infrared signal of the middle near field region.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

A going back and charging system for a sweeping robot and a method for controlling a going back and charging system for a sweeping robot according to embodiments of the present disclosure are described below with reference to drawings.

Figure 1:
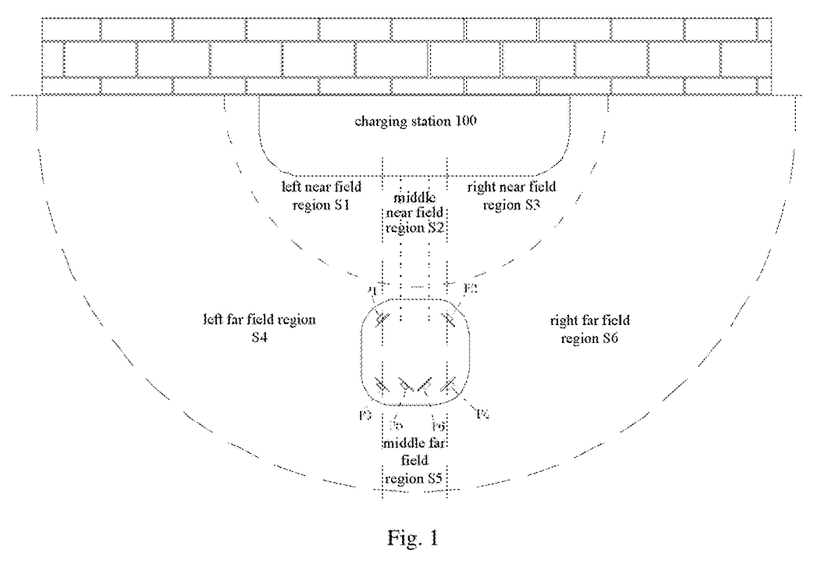
FIG. 1 is a schematic diagram showing a going back and charging system for a sweeping robot according to an embodiment of the present disclosure.

FIG. 1 is a schematic diagram showing a going back and charging system for a sweeping robot according to an embodiment of the present disclosure. As shown in FIG. 1, the system includes: a charging station 100, six infrared receiving tubes P1, P2, P3, P4, P5, P6 disposed on the sweeping robot and a going back and charging control device (not shown).

The charging station 100 is configured to emit a plurality of different encoded groups of infrared signals, so as to divide an area in front of the charging station 100 into six different signal regions S1, S2, S3, S4, S5, S6. The six different signal regions S1, S2, S3, S4, S5, S6 include: a left near field region S1, a middle near field region S2, a right near field region S3, a left far field region S4, a middle far field region S5 and a right far field region S6. The six infrared receiving tubes P1, P2, P3, P4, P5, P6 include: a first infrared receiving tube P1, a second infrared receiving tube P2, a third infrared receiving tube P3, a fourth infrared receiving tube P4, a fifth infrared receiving tube P5 and a sixth infrared receiving tube P6. The first infrared receiving tube P1, the second infrared receiving tube P2, the third infrared receiving tube P3 and the fourth infrared receiving tube P4 are disposed at four corners of the sweeping robot in a symmetrical manner with respect to a front-rear direction and a left-right direction. The fifth infrared receiving tube P5 and the sixth infrared receiving tube P6 are disposed at a front end or a rear end of the sweeping robot in a symmetrical manner with respect to the front-rear direction. The going back and charging control device is configured to: control the six infrared receiving tubes P1, P2, P3, P4, P5, P6 to be turned on if it is determined that the sweeping robot needs to be charged, control the sweeping robot to walk toward the middle near field region S2 if any one of the six infrared receiving tubes P1, P2, P3, P4, P5, P6 receives an infrared signal emitted from the charging station 100, and control the sweeping robot to continue to walk until the sweeping robot docks with the charging station 100 successfully if the fifth infrared receiving tube P5 and the sixth infrared receiving tube P6 receive an infrared signal of the middle near field region S2.

Figure 2:
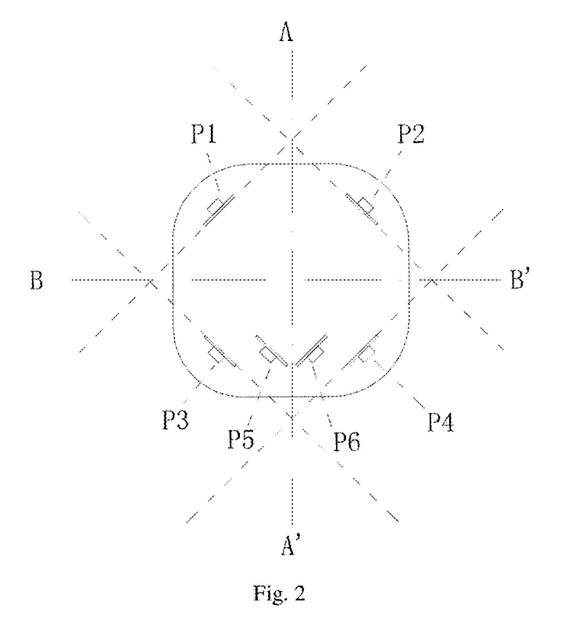
FIG. 2 is a schematic diagram showing an arrangement of six infrared receiving tubes according to an embodiment of the present disclosure.
Figure 3:
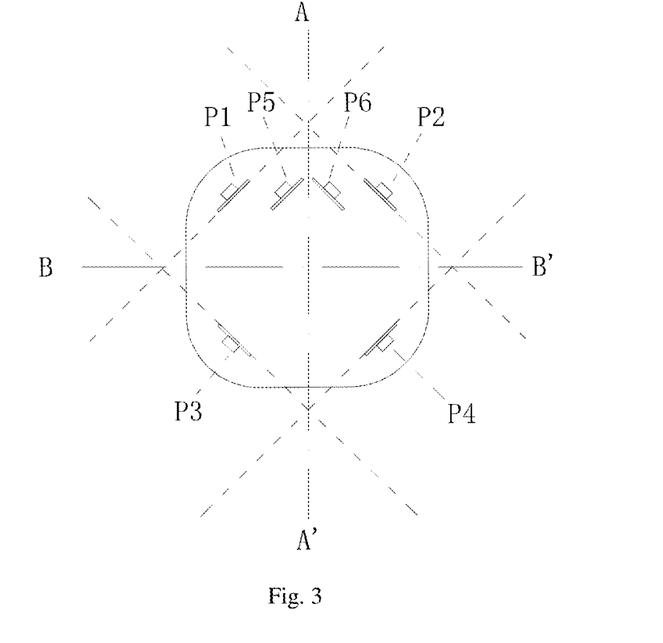
FIG. 3 is a schematic diagram showing an arrangement of six infrared receiving tubes according to another embodiment of the present disclosure.

Specifically, as shown in FIG. 2 and FIG. 3, the first infrared receiving tube P1 and the second infrared receiving tube P2 are disposed symmetrically with respect to a central axis A-A'. The third infrared receiving tube P3 and the fourth infrared receiving tube P4 are disposed symmetrically with respect to the central axis A-A'. The first infrared receiving tube P1 and the third infrared receiving tube P3 are disposed symmetrically with respect to a central axis B-B'. The second infrared receiving tube P2 and the fourth infrared receiving tube P4 are disposed symmetrically with respect to the central axis B-B'. As shown in FIG. 2, the fifth infrared receiving tube P5 and the sixth infrared receiving tube P6 are disposed symmetrically with respect to the central axis A-A' at the rear end of the sweeping robot. As shown in FIG. 3, the fifth infrared receiving tube P5 and the sixth infrared receiving tube P6 are disposed symmetrically with respect to the central axis A-A' at the front end of the sweeping robot. In this way, when the sweeping robot walks forward or backward, the plurality of differently encoded groups of infrared signals emitted from the charging station 100 may be searched for by the first infrared receiving tube P1 and the second infrared receiving tube P2 or by the fifth infrared receiving tube P5 and the sixth infrared receiving tube P6. When the sweeping robot walks in a transverse direction (from left to right, or from right to left), the plurality of differently encoded groups of infrared signals emitted from the charging station 100 may be searched for by the first infrared receiving tube P1 and the third infrared receiving tube P3 or by the second infrared receiving tube P2 and the fourth infrared receiving tube P4.

During the work of the sweeping robot, if the sweeping robot needs to be charged, the going back and charging control device for the sweeping robot controls the six infrared receiving tubes P1, P2, P3, P4, P5, P6 to be turned on. If any one of the six infrared receiving tubes P1, P2, P3, P4, P5, P6 receives an infrared signal emitted from the charging station 100, the going back and charging control device controls the sweeping robot to walk toward the middle near field region S2 from any one of the left far field region S4, middle far field region S5, right far field region S6, left near field region S1 and right near field region S3, until the fifth infrared receiving tube P5 and the sixth infrared receiving tube P6 receive an infrared signal of the middle near field region S2, i.e., the fifth and sixth receiving tubes are in the middle near field region S2. Then, the going back and charging control device adjusts the direction to which the front end or the rear end of the sweeping robot faces so as to ensure that the charging interface of the sweeping robot align with the charging station 100, and controls the sweeping robot to walk along a straight line until the sweeping robot docks with the charging station 100 successfully.

Therefore, the going back and charging system for a sweeping robot according to embodiments of the present disclosure may control the sweeping robot to arrive at the middle near field region quickly according to the infrared signals emitted from the charging station and received by the six infrared receiving tubes, and adjust the sweeping robot in the middle near field region so as to ensure that the charging interface of the sweeping robot align with the charging station, such that the sweeping robot may dock with the charging station accurately, the period of time during which the sweeping robot goes back for being charged may be reduced effectively, the problem that the sweeping robot cannot dock with the charging station stably since the left and right side brushes brush the charging station during the docking process may be avoided effectively, and the system may be adapt to complex environment.

Figure 4:
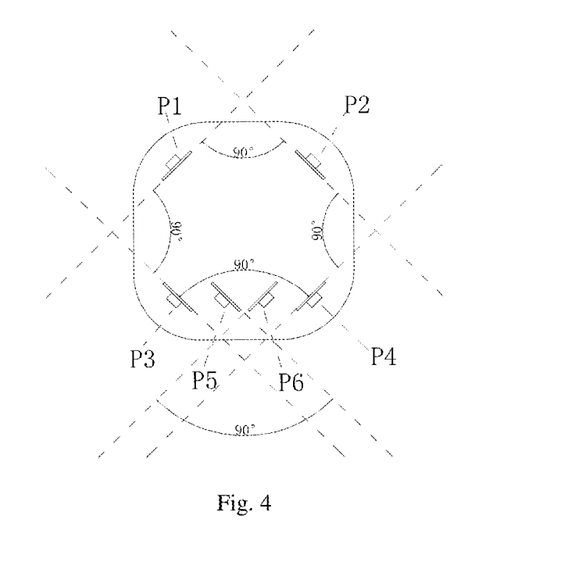
FIG. 4 is a schematic diagram showing a receiving region formed by six infrared receiving tubes according to an embodiment of the present disclosure.

According to an embodiment of the present disclosure, as shown in FIG. 4, an angle between a receiving surface of the first infrared receiving tube P1 and a receiving surface of the second infrared receiving tube P2 is 90°. An angle between the receiving surface of the first infrared receiving tube P1 and a receiving surface of the third infrared receiving tube P3 is 90°. An angle between the receiving surface of the second infrared receiving tube P2 and a receiving surface of the fourth infrared receiving tube P4 is 90°. An angle between the receiving surface of the third infrared receiving tube P3 and the receiving surface of the fourth infrared receiving tube P4 is 90°. An angle between a receiving surface of the fifth infrared receiving tube P5 and a receiving surface of the sixth infrared receiving tube P6 is 90°.

Specifically, each of the six infrared receiving tubes P1, P2, P3, P4, P5, P6 may be a 90° infrared sensor. Since the angle between the receiving surface of the first infrared receiving tube P1 and the receiving surface of the second infrared receiving tube P2 is 90°, the angle between the receiving surface of the third infrared receiving tube P3 and the receiving surface of the fourth infrared receiving tube P4 is 90°, and the angle between the receiving surface of the fifth infrared receiving tube P5 and the receiving surface of the sixth infrared receiving tube P6 is 90°, the accuracy of adjusting the sweeping robot from side to side is high, such that the charging interface of the sweeping robot may dock with the charging station 100 accurately and quickly, and the precision of movement when the sweeping robot walks forward or backward may be improved. In addition, since the angle between the receiving surface of the first infrared receiving tube P1 and the receiving surface of the third infrared receiving tube P3 is 90°, and the angle between the receiving surface of the second infrared receiving tube P2 and the receiving surface of the fourth infrared receiving tube P4 is 90°, the precision of movement when the sweeping robot walks in the transverse direction may be improved. Further, by adopting the above ways, the blind-zone of receiving the infrared signals may be reduced effectively, such that the sweeping robot may be at any position to receive the infrared signals emitted from the charging station 100.

According to an embodiment of the present disclosure, the fifth and sixth infrared receiving tubes P5, P6 are disposed at the rear end of the sweeping robot in a symmetrical manner with respect to a front-end central axis. If it is determined according to the received infrared signal that the sweeping robot is in the left far field region S4 or in the right far field region S6, the going back and charging control device controls the sweeping robot to walk toward the left near field region S1 from the left far field region S4 or to walk toward the right near field region S3 from the right far field region S6, and controls the sweeping robot to walk toward the middle near field region S2 after the sweeping robot enters the left near field region S1 or the right near field region S3, and controls the rear end of the sweeping robot to align with and to approach the charging station 100 after the sweeping robot enters the middle near field region S2, until the rear end of the sweeping robot docks with the charging station 100 successfully. If it is determined according to the received infrared signal that the sweeping robot is in the left near field region S1 or in the right near field region S3, the going back and charging control device controls the sweeping robot to walk toward the middle near field region S2, and controls the rear end of the sweeping robot to align with and to approach the charging station 100 after the sweeping robot enters the middle near field region S2, until the rear end of the sweeping robot docks with the charging station 100 successfully. If it is determined according to the received infrared signal that the sweeping robot is in the middle near field region S2, the going back and charging control device controls the rear end of the sweeping robot to align with and to approach the charging station 100, until the rear end of the sweeping robot docks with the charging station 100 successfully. If it is determined according to the received infrared signal that the sweeping robot is in the middle far field region S5, the going back and charging control device controls the sweeping robot to walk toward the middle near field region S2, and controls the rear end of the sweeping robot to align with and to approach the charging station 100 after the sweeping robot enters the middle near field region S2, until the rear end of the sweeping robot docks with the charging station 100 successfully. In this embodiment, the charging interface of the sweeping robot is disposed at the rear end of the sweeping robot.

Figure 5:
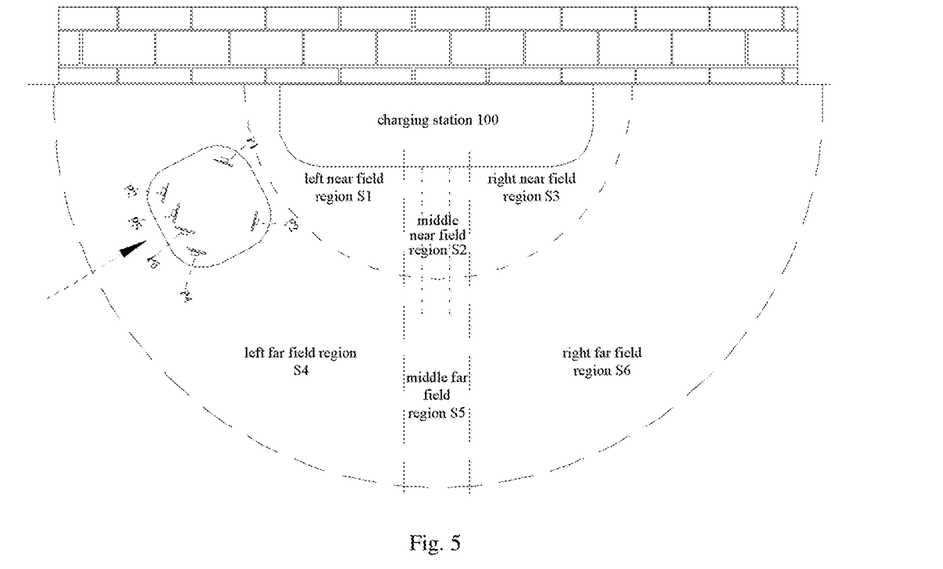
FIG. 5 is a schematic diagram showing a sweeping robot walking toward a left near field region according to an embodiment of the present disclosure.
Figure 6:
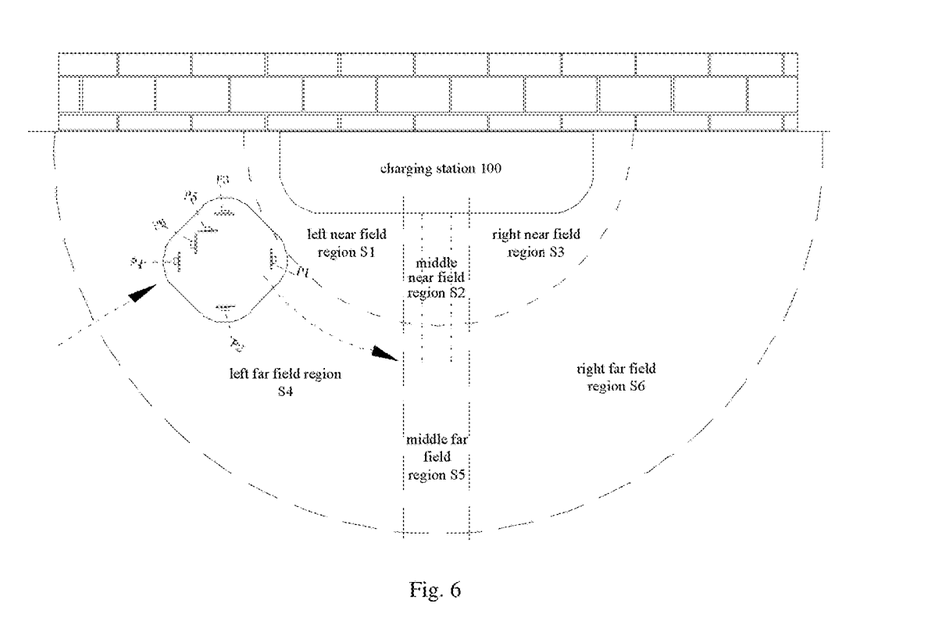
FIG. 6 is a schematic diagram showing a sweeping robot walking toward a middle near field region from a left near field region according to an embodiment of the present disclosure.
Figure 7:
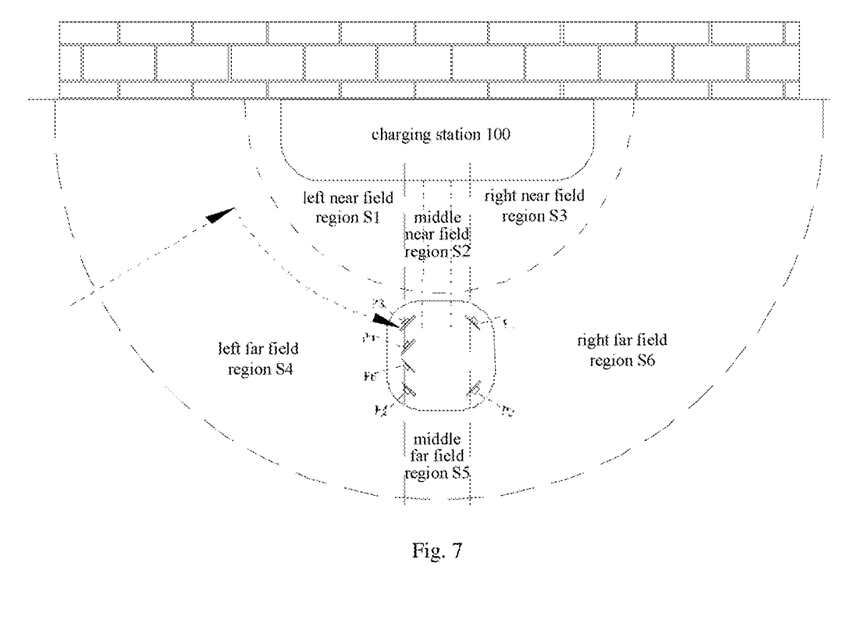
FIG. 7 is a schematic diagram showing a sweeping robot entering the middle near field region according to an embodiment of the present disclosure.
Figure 8:
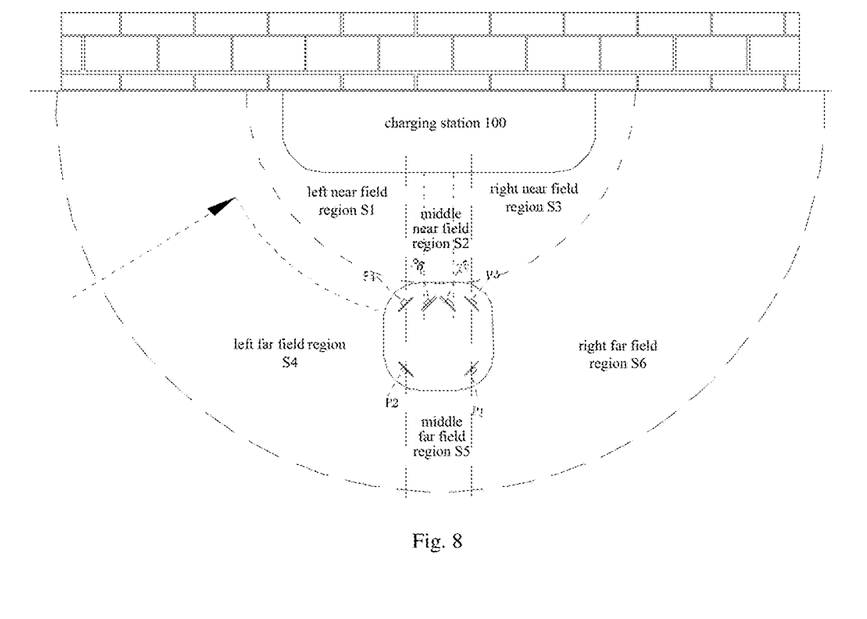
FIG. 8 is a schematic diagram showing a sweeping robot adjusting its location according to an embodiment of the present disclosure.

Specifically, as shown in FIG. 5, if the sweeping robot receives an infrared signal of the left far field region, i.e., the sweeping robot enters the left far field region S4, the going back and charging control device adjusts the heading direction of the sweeping robot, and controls the sweeping robot to walk toward the left near field region S1 at a first preset speed (such as 0.35 m/s) until the sweeping robot receives an infrared signal of the left near field region. Then the going back and charging control device controls the sweeping robot to rotate by a certain angle (as shown in FIG. 6), and controls the sweeping robot to approach the middle near field region S2 along a trajectory with a radius R, until any one of the six infrared receiving tubes receives the infrared signal of the middle near field region, as shown in FIG. 7. And then, the going back and charging control device controls the sweeping robot to spin around, until the fifth and sixth infrared receiving tubes receive the infrared signal of the middle near field region, i.e., controls the rear end of the sweeping robot to align with the charging station 100, as shown in FIG. 8. Lastly, the going back and charging control device controls the sweeping robot to approach the charging station 100 until the rear end of the sweeping robot docks with the charging station 100 successfully, such that the sweeping robot may dock with the charging station accurately and quickly. It should be understood that, if the charging interface of the sweeping robot is disposed at the rear end, the problem that it is difficult to assemble the front end and the structure design is complex due to a cleaning part disposed at the front end may be solved. The going back and charging process in any other situation is not described herein.

According to an embodiment of the present disclosure, the fifth and sixth infrared receiving tubes P5, P6 are disposed at the front end of the sweeping robot in a symmetrical manner with respect to a front-end central axis. If it is determined according to the received infrared signal that the sweeping robot is in the left far field region S4 or in the right far field region S6, the going back and charging control device controls the sweeping robot to walk toward the left near field region S1 from the left far field region S4 or to walk toward the right near field region S3 from the right far field region S6, and controls the sweeping robot to walk toward the middle near field region S2 after the sweeping robot enters the left near field region S1 or the right near field region S3, and controls the front end of the sweeping robot to align with and to approach the charging station 100 after the sweeping robot enters the middle near field region S2, until the front end of the sweeping robot docks with the charging station 100 successfully. If it is determined according to the received infrared signal that the sweeping robot is in the left near field region S1 or in the right near field region S3, the going back and charging control device controls the sweeping robot to walk toward the middle near field region S2, and controls the front end of the sweeping robot to align with and to approach the charging station 100 after the sweeping robot enters the middle near field region S2, until the front end of the sweeping robot docks with the charging station 100 successfully. If it is determined according to the received infrared signal that the sweeping robot is in the middle near field region S2, the going back and charging control device controls the front end of the sweeping robot to align with and to approach the charging station 100, until the front end of the sweeping robot docks with the charging station 100 successfully. If it is determined according to the received infrared signal that the sweeping robot is in the middle far field region S5, the going back and charging control device controls the sweeping robot to walk toward the middle near field region S2, and controls the front end of the sweeping robot to align with and to approach the charging station 100 after the sweeping robot enters the middle near field region S2, until the front end of the sweeping robot docks with the charging station 100 successfully. In this embodiment, the charging interface of the sweeping robot is disposed at the front end of the sweeping robot. The specific going back and charging process is not described herein.

With the going back and charging system for a sweeping robot according to embodiments of the present disclosure, the rear end or the front end of the sweeping robot docks with the charging station, such that the problem that the sweeping robot cannot dock with the charging station stably since the left and right side brushes brush the charging station during the docking process may be avoided effectively.

Figure 9:
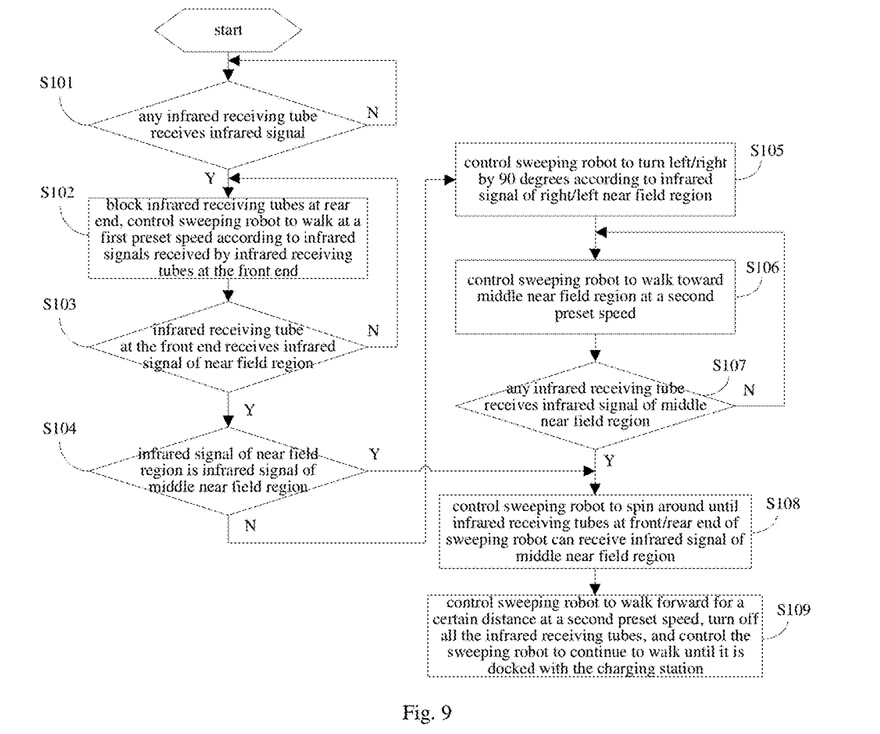
FIG. 9 is a flow chart showing a method for controlling a going back and charging system for a sweeping robot according to an embodiment of the present disclosure.

FIG. 9 is a flow chart showing a method for controlling a going back and charging system for a sweeping robot according to an embodiment of the present disclosure. As shown in FIG. 9, the method includes the followings.

In S101, it is determined whether an infrared receiving tube receives an infrared signal. If one of the six infrared receiving tubes receives an infrared signal emitted from the charging station, S102 is executed, otherwise, S101 is repeated.

In S102, the infrared receiving tube at the rear end is blocked, and the sweeping robot is controlled to walk at a first preset speed (such as 0.35 m/s) according to the infrared signal received by the infrared receiving tube at the front end.

Specifically, if the fifth and sixth infrared receiving tubes are disposed at the rear end of the sweeping robot, the going back and charging control device shields the infrared signals received by the third, fourth, fifth and sixth infrared receiving tubes, and controls the sweeping robot to walk at a speed of 0.35 m/s according to the infrared signals received by the first and second infrared receiving tubes. If the fifth and sixth infrared receiving tubes are disposed at the front end of the sweeping robot, the going back and charging control device shields the infrared signals received by the third and fourth infrared receiving tubes, and controls the sweeping robot to walk at a speed of 0.35 m/s according to the infrared signals received by the first and second infrared receiving tubes or by the fifth and sixth infrared receiving tubes. It should be understood that, the infrared signals received by the fifth and sixth infrared receiving tubes may also be shielded.

In S103, it is determined whether the infrared receiving tubes at the front end receive the infrared signal of the near field region, i.e., it is determined whether the first and second infrared receiving tubes receive one of the infrared signal of the left near field region, the infrared signal of the right near field region and the infrared signal of the middle near field region. If yes, S104 is executed, otherwise, S102 is executed.

In S104, it is determined whether the infrared signal of the near field region is the infrared signal of the middle near field region. If yes, S109 is executed, otherwise, S105 is executed.

In S105, the sweeping robot is controlled to rotate to right/left by 90° according to the received infrared signal of the left/right near field region. Specifically, if the first and second infrared receiving tubes receive the infrared signal of the left near field region, the sweeping robot is controlled to rotate to the right by 90°. If the first and second infrared receiving tubes receive the infrared signal of the right near field region, the sweeping robot is controlled to rotate to the left by 90°.

In S106, the sweeping robot is controlled to walk toward the middle near field region at a second preset speed (such as 0.1-0.2 m/s).

In S107, it is determined whether an infrared receiving tube receives the infrared signal of the middle near field region, if yes, S108 is executed, otherwise, S106 is executed.

In S108, the sweeping robot is controlled to rotate, until the infrared receiving tubes at the back/front end of the sweeping robot can receive the infrared signal of the middle near field region. In other words, if the charging interface of the sweeping robot is disposed at the rear end, the rear end of the sweeping robot is controlled to align with the charging station. If the charging interface of the sweeping robot is disposed at the front end, the front end of the sweeping robot is controlled to align with the charging station.

In S109, after the sweeping robot is controlled to walk forward for a certain distance at the second preset speed, all the infrared receiving tubes are turned off and the sweeping robot is controlled to continue to walk until the sweeping robot docks with the charging station successfully.

Specifically, if the charging interface of the sweeping robot align with the charging station and the sweeping robot is controlled to walk to a position close to the baffle of charging station at the second preset speed, all the infrared receiving tubes are turned off, and the sweeping robot is controlled to dock with the charging station.

The going back and charging system for a sweeping robot according to embodiments of the present disclosure controls the sweeping robot to go back to the charging station quickly according to the infrared signals emitted from the charging station and received by the six infrared receiving tubes disposed on the sweeping robot, such that the period of time during which the sweeping robot goes back for being charged is reduced effectively, and the system is adapt to the complex environment. Meanwhile, the sweeping robot is controlled to dock with the charging station accurately and quickly by the infrared receiving tubes disposed at the front end or the rear end of the sweeping robot, the problem that the sweeping robot cannot dock with the charging station stably since the left and right side brushes brush the charging station during the docking process may be avoided effectively.

Figure 10:
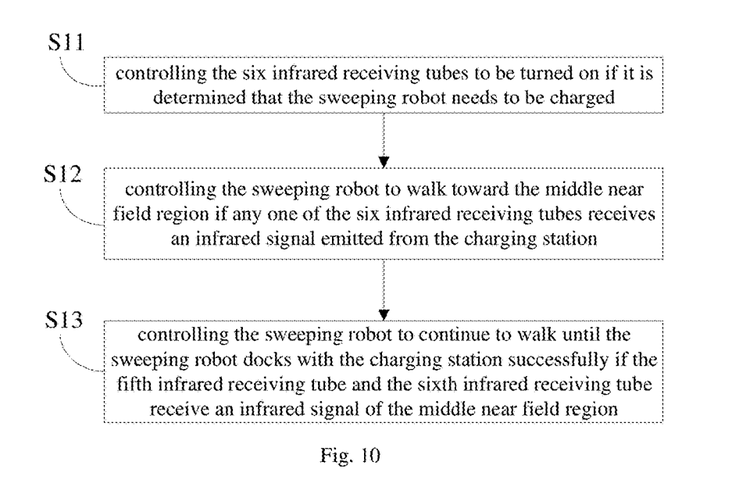
FIG. 10 is a flow chart showing a method for controlling a going back and charging system for a sweeping robot according to another embodiment of the present disclosure.

FIG. 10 is a flow chart showing a method for controlling a going back and charging system for a sweeping robot according to another embodiment of the present disclosure. The going back and charging system includes a charging station and six infrared receiving tubes disposed on the sweeping robot. The charging station is configured to emit a plurality of differently encoded groups of infrared signals, so as to divide an area in front of the charging station into six different signal regions, in which the six different signal regions include: a left near field region, a middle near field region, a right near field region, a left far field region, a middle far field region and a right far field region. A first infrared receiving tube, a second infrared receiving tube, a third infrared receiving tube and a fourth infrared receiving tube are respectively disposed at four corners of the sweeping robot in a symmetrical manner with respect to a front-rear direction and a left-right direction. A fifth infrared receiving tube and a sixth infrared receiving tube are disposed at a front end or a rear end of the sweeping robot, and the fifth infrared receiving tube and the sixth infrared receiving tube are symmetrical with respect to the front-rear direction. Regarding the specific structure of the going back and charging system, a reference may be made to FIGS. 1-3, which is not described in detail herein.

According to an embodiment of the present disclosure, as shown in FIG. 4, an angle between a receiving surface of the first infrared receiving tube and a receiving surface of the second infrared receiving tube is 90°. An angle between the receiving surface of the first infrared receiving tube and a receiving surface of the third infrared receiving tube is 90°. An angle between the receiving surface of the second infrared receiving tube and a receiving surface of the fourth infrared receiving tube is 90°. An angle between the receiving surface of the third infrared receiving tube and the receiving surface of the fourth infrared receiving tube is 90°. An angle between a receiving surface of the fifth infrared receiving tube and a receiving surface of the sixth infrared receiving tube is 90°.

Specifically, each of the six infrared receiving tubes may be a 90° infrared sensor. Since the angle between the receiving surface of the first infrared receiving tube and the receiving surface of the second infrared receiving tube is 90°, the angle between the receiving surface of the third infrared receiving tube and the receiving surface of the fourth infrared receiving tube is 90°, and the angle between the receiving surface of the fifth infrared receiving tube and the receiving surface of the sixth infrared receiving tube is 90°, the accuracy of adjusting the sweeping robot from side to side is high, such that the charging interface of the sweeping robot may dock with the charging station 100 accurately and quickly, and the precision of movement when the sweeping robot walks forward or backward may be improved. In addition, since the angle between the receiving surface of the first infrared receiving tube and the receiving surface of the third infrared receiving tube is 90°, and the angle between the receiving surface of the second infrared receiving tube and the receiving surface of the fourth infrared receiving tube is 90°, the precision of movement when the sweeping robot walks in the transverse direction may be improved. Further, by adopting the above ways, the blind-zone of receiving the infrared signals may be reduced effectively, such that the sweeping robot may be at any position to receive the infrared signals emitted from the charging station.

As shown in FIG. 10, the method includes the followings.

In S11, the six infrared receiving tubes are controlled to be turned on if the sweeping robot needs to be charged.

In S12, if any one of the six infrared receiving tubes receives an infrared signal emitted from the charging station, the sweeping robot is controlled to walk toward the middle near field region.

In S13, if the fifth and sixth infrared receiving tubes receive the infrared signal of the middle near field region, the sweeping robot is controlled to continue to walk until the sweeping robot docks with the charging station successfully.

Specifically, during the work of the sweeping robot, if the sweeping robot needs to be charged, the six infrared receiving tubes are controlled to be turned on. If any one of the six infrared receiving tubes receives an infrared signal emitted from the charging station, the sweeping robot is controlled to walk toward the middle near field region from any one of the left far field region, middle far field region, right far field region, left near field region and right near field region, until the fifth infrared receiving tube and the sixth infrared receiving tube receive an infrared signal of the middle near field region, i.e., the fifth and sixth receiving tubes are in the middle near field region. Then, the direction to which the front end or the rear end of the sweeping robot faces is adjusted so as to ensure that the charging interface of the sweeping robot align with the charging station, and the sweeping robot is controlled to walk along a straight line until the sweeping robot docks with the charging station successfully.

According to an embodiment of the present disclosure, the fifth and sixth infrared receiving tubes are disposed at the rear end of the sweeping robot in a symmetrical manner with respect to a front-end central axis. If it is determined according to the received infrared signal that the sweeping robot is in the left far field region or in the right far field region, the sweeping robot is controlled to walk toward the left near field region from the left far field region or to walk toward the right near field region from the right far field region, and the sweeping robot is controlled to walk toward the middle near field region after the sweeping robot enters the left near field region or the right near field region, and the rear end of the sweeping robot is controlled to align with and to approach the charging station after the sweeping robot enters the middle near field region, until the rear end of the sweeping robot docks with the charging station successfully. If it is determined according to the received infrared signal that the sweeping robot is in the left near field region or in the right near field region, the sweeping robot is controlled to walk toward the middle near field region, and the rear end of the sweeping robot is controlled to align with and to approach the charging station after the sweeping robot enters the middle near field region, until the rear end of the sweeping robot docks with the charging station successfully. If it is determined according to the received infrared signal that the sweeping robot is in the middle near field region, the rear end of the sweeping robot is controlled to align with and to approach the charging station, until the rear end of the sweeping robot docks with the charging station successfully. If it is determined according to the received infrared signal that the sweeping robot is in the middle far field region, the sweeping robot is controlled to walk toward the middle near field region, and the rear end of the sweeping robot is controlled to align with and to approach the charging station after the sweeping robot enters the middle near field region, until the rear end of the sweeping robot docks with the charging station successfully. In this embodiment, the charging interface of the sweeping robot is disposed at the rear end of the sweeping robot.

Specifically, as shown in FIG. 5, if the sweeping robot receives an infrared signal of the left far field region, i.e., the sweeping robot enters the left far field region, the heading direction of the sweeping robot is adjusted, and the sweeping robot is controlled to walk toward the left near field region at a first preset speed (such as 0.35 m/s) until the sweeping robot receives an infrared signal of the left near field region. Then the sweeping robot is controlled to rotate by a certain angle (as shown in FIG. 6), and the sweeping robot is controlled to approach the middle near field region along a trajectory with a radius R, until any one of the six infrared receiving tubes receives the infrared signal of the middle near field region, as shown in FIG. 7. And then, the sweeping robot is controlled to spin around, until the fifth and sixth infrared receiving tubes receive the infrared signal of the middle near field region, i.e., the rear end of the sweeping robot is controlled to align with the charging station, as shown in FIG. 8. Lastly, the sweeping robot is controlled to approach the charging station until the rear end of the sweeping robot docks with the charging station successfully, such that the sweeping robot may dock with the charging station accurately and quickly. It should be understood that, if the charging interface of the sweeping robot is disposed at the rear end, the problem that it is difficult to assemble the front end and the structure design is complex due to a cleaning part disposed at the front end may be solved. The going back and charging process in any other situation is not described herein.

According to an embodiment of the present disclosure, the fifth and sixth infrared receiving tubes are disposed at the front end of the sweeping robot in a symmetrical manner with respect to a front-end central axis. If it is determined according to the received infrared signal that the sweeping robot is in the left far field region or in the right far field region, the sweeping robot is controlled to walk toward the left near field region from the left far field region or to walk toward the right near field region from the right far field region, and the sweeping robot is controlled to walk toward the middle near field region after the sweeping robot enters the left near field region or the right near field region, and the front end of the sweeping robot is controlled to align with and to approach the charging station after the sweeping robot enters the middle near field region, until the front end of the sweeping robot docks with the charging station successfully. If it is determined according to the received infrared signal that the sweeping robot is in the left near field region or in the right near field region, the sweeping robot is controlled to walk toward the middle near field region, and the front end of the sweeping robot is controlled to align with and to approach the charging station after the sweeping robot enters the middle near field region, until the front end of the sweeping robot docks with the charging station successfully. If it is determined according to the received infrared signal that the sweeping robot is in the middle near field region, the front end of the sweeping robot is controlled to align with and to approach the charging station, until the front end of the sweeping robot docks with the charging station successfully. If it is determined according to the received infrared signal that the sweeping robot is in the middle far field region, the sweeping robot is controlled to walk toward the middle near field region, and the front end of the sweeping robot is controlled to align with and to approach the charging station after the sweeping robot enters the middle near field region, until the front end of the sweeping robot docks with the charging station successfully. In this embodiment, the charging interface of the sweeping robot is disposed at the front end of the sweeping robot. The specific going back and charging process is not described herein.

With the method for controlling a going back and charging system for a sweeping robot according embodiments of the present disclosure, if any one of the six infrared receiving tubes disposed on the sweeping robot receives the infrared signal emitted from the charging station, the sweeping robot is controlled to walk toward the middle near field region, and if the fifth infrared receiving tube and the sixth infrared receiving tube receive the infrared signal of the middle near field region, the sweeping robot is controlled to continue to walk until the sweeping robot docks with the charging station successfully. With the method according to the present disclosure, the sweeping robot may be controlled to go back to the charging station quickly, such that the period of time during which the sweeping robot goes back to the charging station for being charged is reduced effectively. Meanwhile, the sweeping robot is controlled to dock with the charging station accurately and quickly, such that the problem that the sweeping robot cannot dock with the charging station stably since the left and right side brushes brush the charging station during the docking process may be avoided effectively, and thus the sweeping robot is adapt to complex environment.

A non-transitory computer-readable storage medium also is provided according to embodiments of the present disclosure. The non-transitory computer-readable storage medium has stored therein instructions that, when executed by a processor of a device, causes the device to perform the above method for controlling a going back and charging system for a sweeping robot.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A going back and charging system for a sweeping robot, comprising:
   a charging station, configured to emit a plurality of differently encoded groups of infrared signals, so as to divide an area in front of the charging station into six different signal regions, wherein the six different signal regions comprise: a left near field region, a middle near field region, a right near field region, a left far field region, a middle far field region and a right far field region;
   six infrared receiving tubes, disposed on the sweeping robot, wherein a first infrared receiving tube, a second infrared receiving tube, a third infrared receiving tube and a fourth infrared receiving tube are respectively disposed at four corners of the sweeping robot in a symmetrical manner with respect to a front-rear direction and a left-right direction, a fifth infrared receiving tube and a sixth infrared receiving tube are disposed at a front end or a rear end of the sweeping robot, and the fifth infrared receiving tube and the sixth infrared receiving tube are symmetrical with respect to the front-rear direction; and
   a going back and charging control device, configured to:
     control the six infrared receiving tubes to be turned on if it is determined that the sweeping robot needs to be charged;
     control the sweeping robot to walk toward the middle near field region if any one of the six infrared receiving tubes receives an infrared signal emitted from the charging station; and
     control the sweeping robot to continue to walk until the sweeping robot docks with the charging station successfully if the fifth infrared receiving tube and the sixth infrared receiving tube receive an infrared signal of the middle near field region.

2. The system according to claim 1, wherein an angle between a receiving surface of the first infrared receiving tube and a receiving surface of the second infrared receiving tube is 90°, an angle between the receiving surface of the first infrared receiving tube and a receiving surface of the third infrared receiving tube is 90°, an angle between the receiving surface of the second infrared receiving tube and a receiving surface of the fourth infrared receiving tube is 90°, an angle between the receiving surface of the third infrared receiving tube and the receiving surface of the fourth infrared receiving tube is 90°, and an angle between a receiving surface of the fifth infrared receiving tube and a receiving surface of the sixth infrared receiving tube is 90°.

3. The system according to claim 1, wherein if the fifth infrared receiving tube and the sixth infrared receiving tube are disposed at the rear end of the sweeping robot,
   if it is determined according to a received infrared signal that the sweeping robot is in the left far field region or in the right far field region, the going back and charging control device is configured to:
     control the sweeping robot to walk toward the left near field region from the left far field region or to walk toward the right near field region from the right far field region;
     control the sweeping robot to walk toward the middle near field region, after the sweeping robot enters the left near field region or the right near field region; and
     control the rear end of the sweeping robot to align with and to approach the charging station until the rear end of the sweeping robot docks with the charging station successfully, after the sweeping robot enters the middle near field region;
   or
   if it is determined according to a received infrared signal that the sweeping robot is in the left near field region or in the right near field region, the going back and charging control device is configured to:
     control the sweeping robot to walk toward the middle near field region; and
     control the rear end of the sweeping robot to align with and to approach the charging station until the rear end of the sweeping robot docks with the charging station successfully, after the sweeping robot enters the middle near field region;
   or
   if it is determined according to a received infrared signal that the sweeping robot is in the middle near field region, the going back and charging control device is configured to:

control the rear end of the sweeping robot to align with and to approach the charging station until the rear end of the sweeping robot docks with the charging station successfully;

or if it is determined according to a received infrared signal that the sweeping robot is in the middle far field region, the going back and charging control device is configured to:

control the sweeping robot to walk toward the middle near field region; and control the rear end of the sweeping robot to align with and to approach the charging station until the rear end of the sweeping robot docks with the charging station successfully, after the sweeping robot enters the middle near field region.

4. The system according to claim 1, wherein if the fifth infrared receiving tube and the sixth infrared receiving tube are disposed at the front end of the sweeping robot, if it is determined according to a received infrared signal that the sweeping robot is in the left far field region or in the right far field region, the going back and charging control device is configured to:

control the sweeping robot to walk toward the left near field region from the left far field region or to walk toward the right near field region from the right far field region;

control the sweeping robot to walk toward the middle near field region, after the sweeping robot enters the left near field region or the right near field region; and control the front end of the sweeping robot to align with and to approach the charging station until the front end of the sweeping robot docks with the charging station successfully, after the sweeping robot enters the middle near field region;

or if it is determined according to a received infrared signal that the sweeping robot is in the left near field region or in the right near field region, the going back and charging control device is configured to:

control the sweeping robot to walk toward the middle near field region; and control the front end of the sweeping robot to align with and to approach the charging station until the front end of the sweeping robot docks with the charging station successfully, after the sweeping robot enters the middle near field region;

or if it is determined according to a received infrared signal that the sweeping robot is in the middle near field region, the going back and charging control device is configured to:

control the front end of the sweeping robot to align with and to approach the charging station until the front end of the sweeping robot docks with the charging station successfully;

or if it is determined according to a received infrared signal that the sweeping robot is in the middle far field region, the going back and charging control device is configured to:

control the sweeping robot to walk toward the middle near field region; and control the front end of the sweeping robot to align with and to approach the charging station until the front end of the sweeping robot docks with the charging station successfully, after the sweeping robot enters the middle near field region.

5. The system according to claim 1, wherein it is determined according to the received infrared signal that the sweeping robot is in the left far field region or in the right far field region or in the middle far field region, the going back and charging control device is further configured to:

block the infrared receiving tubes at the rear end of the sweeping robot, and control the sweeping robot to walk at a first preset speed according to an infrared signal received by the infrared receiving tubes at the front end of the sweeping robot.

6. The system according to claim 1, wherein if it is determined according to the received infrared signal that the sweeping robot is in the left near field region or in the right near field region, the going back and charging control device is further configured to:

control the sweeping robot to rotate to right by 90° according to an infrared signal received from the left near field region, or control the sweeping robot to rotate to left by 90° according to an infrared signal received from the right near field region, and then control the sweeping robot to walk toward the middle near field region at a second preset speed.

7. The system according to claim 1, wherein if it is determined according to the received infrared signal that the sweeping robot is in the middle near field region, the going back and charging control device is further configured to:

control the sweeping robot to rotate, until the fifth infrared receiving tube and the sixth infrared receiving tube can receive the infrared signal of the middle near field region.

8. A method for controlling a going back and charging system for a sweeping robot, wherein the going back and charging system comprises: a charging station and six infrared receiving tubes disposed on the sweeping robot, the charging station is configured to emit a plurality of differently encoded groups of infrared signals, so as to divide an area in front of the charging station into six different signal regions, the six different signal regions comprise: a left near field region, a middle near field region, a right near field region, a left far field region, a middle far field region and a right far field region; a first infrared receiving tube, a second infrared receiving tube, a third infrared receiving tube and a fourth infrared receiving tube are respectively disposed at four corners of the sweeping robot in a symmetrical manner with respect to a front-rear direction and a left-right direction, a fifth infrared receiving tube and a sixth infrared receiving tube are disposed at a front end or a rear end of the sweeping robot, and the fifth infrared receiving tube and the sixth infrared receiving tube are symmetrical with respect to the front-rear direction;

the method comprises:

controlling the six infrared receiving tubes to be turned on if it is determined that the sweeping robot needs to be charged;

controlling the sweeping robot to walk toward the middle near field region if any one of the six infrared receiving tubes receives an infrared signal emitted from the charging station; and controlling the sweeping robot to continue to walk until the sweeping robot docks with the charging station successfully if the fifth infrared receiving tube and the sixth infrared receiving tube receive an infrared signal of the middle near field region.

9. The method according to claim 8, wherein an angle between a receiving surface of the first infrared receiving tube and a receiving surface of the second infrared receiving tube is 90°, an angle between the receiving surface of the first infrared receiving tube and a receiving surface of the third infrared receiving tube is 90°, an angle between the receiving surface of the second infrared receiving tube and a receiving surface of the fourth infrared receiving tube is 90°, an angle between the receiving surface of the third infrared receiving tube and the receiving surface of the fourth infrared receiving tube is 90°, and an angle between a receiving surface of the fifth infrared receiving tube and a receiving surface of the sixth infrared receiving tube is 90°.

10. The method according to claim 8, wherein controlling the sweeping robot to walk toward the middle near field region comprises:
if it is determined according to a received infrared signal that the sweeping robot is in the left far field region or in the right far field region, controlling the sweeping robot to walk toward the left near field region from the left far field region or to walk toward the right near field region from the right far field region, and controlling the sweeping robot to walk toward the middle near field region from the left near field region or from the right near field region after the sweeping robot enters the left near field region or the right near field region;
or
if it is determined according to a received infrared signal that the sweeping robot is in the left near field region or in the right near field region, controlling the sweeping robot to walk toward the middle near field region from the left near field region or from the right near field region;
or
if it is determined according to a received infrared signal that the sweeping robot is in the middle far field region, controlling the sweeping robot to walk toward the middle near field region from the middle far field region.

11. The method according to claim 8, wherein if it is determined according to the received infrared signal that the sweeping robot is in the left far field region or in the right far field region or in the middle far field region, the method further comprises:
blocking the infrared receiving tubes at the rear end of the sweeping robot, and controlling the sweeping robot to walk at a first preset speed according to an infrared signal received by the infrared receiving tubes at the front end of the sweeping robot.

12. The method according to claim 8, wherein if it is determined according to the received infrared signal that the sweeping robot is in the left near field region or in the right near field region, the method further comprises:
controlling the sweeping robot to rotate to right by 90° according to an infrared signal received from the left near field region, or controlling the sweeping robot to rotate to left by 90° according to an infrared signal received from the right near field region, and controlling the sweeping robot to walk toward the middle near field region at a second preset speed.

13. The method according to claim 8, wherein if it is determined according to the received infrared signal that the sweeping robot is in the middle near field region, the method further comprises:
controlling the sweeping robot to rotate, until the fifth infrared receiving tube and the sixth infrared receiving tube can receive the infrared signal of the middle near field region.

14. The method according to claim 8, wherein
if the fifth infrared receiving tube and the sixth infrared receiving tube are disposed at the rear end of the sweeping robot, controlling the sweeping robot to continue to walk until the sweeping robot docks with the charging station successfully comprises: controlling the rear end of the sweeping robot to align with and to approach the charging station until the rear end of the sweeping robot docks with the charging station successfully;
if the fifth infrared receiving tube and the sixth infrared receiving tube are disposed at the front end of the sweeping robot, controlling the sweeping robot to continue to walk until the sweeping robot docks with the charging station successfully comprises: controlling the front end of the sweeping robot to align with and to approach the charging station until the front end of the sweeping robot docks with the charging station successfully.

15. A non-transitory computer-readable storage medium having stored therein instructions that, when executed by a processor of a device, causes the device to perform a method for controlling a going back and charging system for a sweeping robot, wherein
the going back and charging system comprises: a charging station and six infrared receiving tubes disposed on the sweeping robot, the charging station is configured to emit a plurality of differently encoded groups of infrared signals, so as to divide an area in front of the charging station into six different signal regions, the six different signal regions comprise: a left near field region, a middle near field region, a right near field region, a left far field region, a middle far field region and a right far field region; a first infrared receiving tube, a second infrared receiving tube, a third infrared receiving tube and a fourth infrared receiving tube are respectively disposed at four corners of the sweeping robot in a symmetrical manner with respect to a front-rear direction and a left-right direction, a fifth infrared receiving tube and a sixth infrared receiving tube are disposed at a front end or a rear end of the sweeping robot, and the fifth infrared receiving tube and the sixth infrared receiving tube are symmetrical with respect to the front-rear direction;
the method comprises:
controlling the six infrared receiving tubes to be turned on if it is determined that the sweeping robot needs to be charged;
controlling the sweeping robot to walk toward the middle near field region if any one of the six infrared receiving tubes receives an infrared signal emitted from the charging station; and
controlling the sweeping robot to continue to walk until the sweeping robot docks with the charging station successfully if the fifth infrared receiving tube and the sixth infrared receiving tube receive an infrared signal of the middle near field region.

16. The non-transitory computer-readable storage medium according to claim 15, wherein controlling the sweeping robot to walk toward the middle near field region comprises:
if it is determined according to a received infrared signal that the sweeping robot is in the left far field region or in the right far field region, controlling the sweeping robot to walk toward the left near field region from the left far field region or to walk toward the right near field region from the right far field region, and controlling the sweeping robot to walk toward the middle near field region from the left near field region or from the right near field region after the sweeping robot enters the left near field region or the right near field region;

or if it is determined according to a received infrared signal that the sweeping robot is in the left near field region or in the right near field region, controlling the sweeping robot to walk toward the middle near field region from the left near field region or from the right near field region;

or if it is determined according to a received infrared signal that the sweeping robot is in the middle far field region, controlling the sweeping robot to walk toward the middle near field region from the middle far field region.

17. The non-transitory computer-readable storage medium according to claim 15, wherein if it is determined according to the received infrared signal that the sweeping robot is in the left far field region or in the right far field region or in the middle far field region, the method further comprises:

blocking the infrared receiving tubes at the rear end of the sweeping robot, and controlling the sweeping robot to walk at a first preset speed according to an infrared signal received by the infrared receiving tubes at the front end of the sweeping robot.

18. The non-transitory computer-readable storage medium according to claim 15, wherein if it is determined according to the received infrared signal that the sweeping robot is in the left near field region or in the right near field region, the method further comprises:

controlling the sweeping robot to rotate to right by 90° according to an infrared signal received from the left near field region, or controlling the sweeping robot to rotate to left by 90° according to an infrared signal received from the right near field region, and controlling the sweeping robot to walk toward the middle near field region at a second preset speed.

19. The non-transitory computer-readable storage medium according to claim 15, if it is determined according to the received infrared signal that the sweeping robot is in the middle near field region, the method further comprises:

controlling the sweeping robot to rotate, until the fifth infrared receiving tube and the sixth infrared receiving tube can receive the infrared signal of the middle near field region.

20. The non-transitory computer-readable storage medium according to claim 15, if the fifth infrared receiving tube and the sixth infrared receiving tube are disposed at the rear end of the sweeping robot, controlling the sweeping robot to continue to walk until the sweeping robot docks with the charging station successfully comprises: controlling the rear end of the sweeping robot to align with and to approach the charging station until the rear end of the sweeping robot docks with the charging station successfully;

if the fifth infrared receiving tube and the sixth infrared receiving tube are disposed at the front end of the sweeping robot, controlling the sweeping robot to continue to walk until the sweeping robot docks with the charging station successfully comprises: controlling the front end of the sweeping robot to align with and to approach the charging station until the front end of the sweeping robot docks with the charging station successfully.

* * * * *